July 20, 1954   F. A. KROHM   2,684,079
FLUID CONTROL VALVE
Filed May 12, 1950

INVENTOR.
FRED A. KROHM
BY Charles S. Perfold
ATTORNEY

Patented July 20, 1954

2,684,079

UNITED STATES PATENT OFFICE 2,684,079

FLUID CONTROL VALVE

Fred A. Krohm, Gary, Ind., assignor to Productive Inventions, Inc., a corporation of Indiana Application May 12, 1950, Serial No. 161,701

4 Claims. (Cl. 137—493.9)

The invention relates generally to fluid control means and more particularly is directed to a valve device for regulating the flow of fluid in a line or conduit of a fluid operated system.

The subject invention may be employed where applicable but is preferably adapted for use in conjunction with conventional vacuum windshield wiper apparatus on automotive vehicles, for maintaining a relatively uniform or constant vacuum pressure in the system. This apparatus generally includes a source of vacuum supply such as the manifold on the engine, a vacuum motor communicatively connected to the source through a conduit or line and a wiper arm and blade assembly operatively connected to the drive shaft of the motor.

It is common knowledge that the motor of such apparatus will not function or perform satisfactorily under all operating conditions because of variations in engine speeds. More particularly in this respect, variations or changes in the speed of the engine will affect the efficiency of the vacuum produced at the manifold or source and in the line leading therefrom to the motor and thereby cause the wiper arm and blade assembly to fluctuate in operation.

One of the principal objects of the invention is to overcome the disadvantage of fluctuation in the operation of the wiper arm and blade assembly by preferably interposing in the line between the vacuum supply and the motor an improved valve device for automatically maintaining a substantially uniform pressure differential in the line so that the power produced by the motor will be sufficiently stabilized to obtain, within practicable limits, a constant or uniform rate of movement of the wiper blade. More particularly, the invention contemplates an arrangement whereby any excess pressure obtaining in the system is controlled so as to prevent abrupt changes or interruptions in the regular or normal oscillating speed of the wiper. The valve device also has the advantage of being automatically closable whenever an abnormal high pressure occurs in the system, such as may be due to backfiring of the engine.

An important object of the invention is to provide a valve device with unique means whereby the valve constituting a component or element of the device can be manually adjusted so that one may predetermine the volume of fluid adapted to pass through the device.

A particular object of the invention is to provide the valve device with a pair of manually adjustable means, either or both of which may be adjusted to predetermine the amount of fluid adapted to pass through the device and so that the device may be interposed in any one of a plurality of positions in the line communicatively connecting the motor with the vacuum supply.

Another object of the invention is to provide an improved valve device which is comparatively small in size and relatively light in weight so that if found desirable it may be supported solely by the conduit or line in which it is interposed.

A further object of the invention is to provide a compact efficient valve device comprised of a minimum number of components or members which can be economically manufactured and readily assembled on a production basis.

Other objects and advantages of the invention will become apparent after the description hereinafter set forth is considered in conjunction with the drawings annexed hereto.

In the drawings wherein, like parts or elements are designated by the same numerals:

Figure 1:
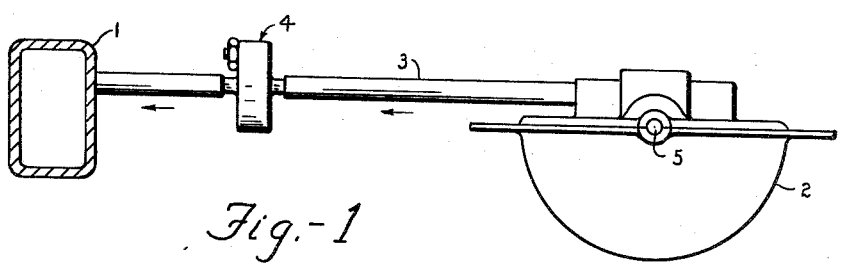
Figure 1 is a side view in elevation exemplifying the valve device interposed and supported in a line or conduit communicatively connecting a source of vacuum supply with a windshield wiper motor.
Figure 2:
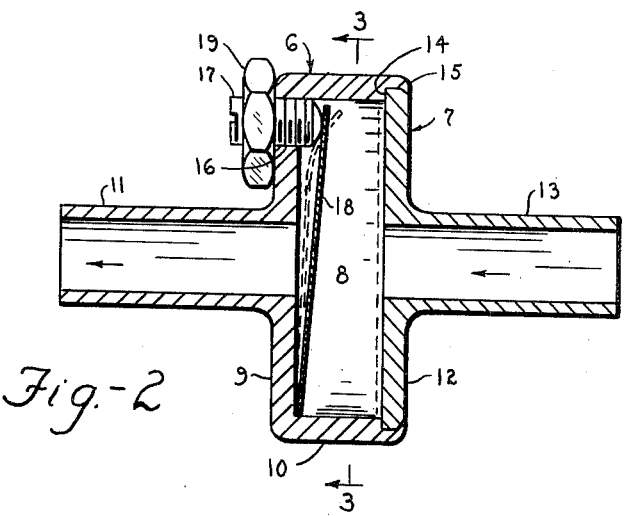
Figure 2 is an enlarged longitudinal section taken through the valve device illustrating details of its construction.
Figures 3, 4:
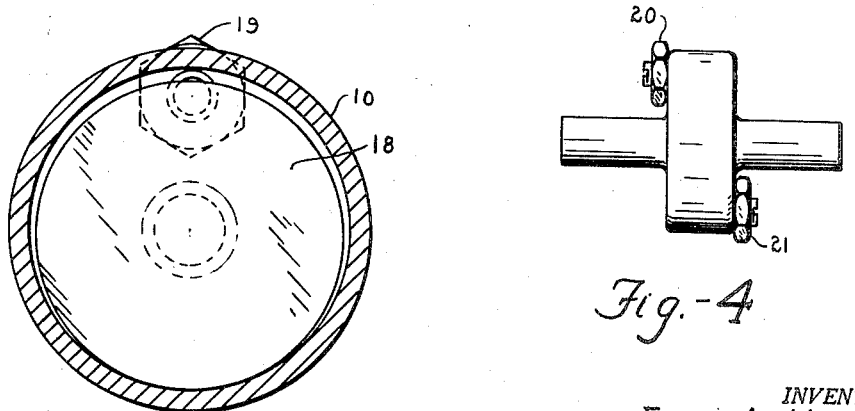
Figure 3 is a transverse section taken substantially on line 3—3 of Figure 2 showing additional details of construction.
Figure 4 is a side view of a modified valve device provided with a pair of mutually adjustable means for predetermining the desired position of a valve constituting a component of the valve device.

Referring to the first embodiment of the invention exemplified in Figures 1, 2 and 3 of the drawings, numeral 1 denotes a source of vacuum, 2 a windshield wiper motor communicatively connected to the supply by a conduit or line 3, and 4 is the valve device embodying the invention interposed in the line 3 for accomplishing the objects above set forth.

The motor 2 may be of a conventional type having, among other things, an oscillatable vane which is operated by a fluid pressure to actuate a shaft 5. A wiper arm and blade assembly is adapted to be carried by the shaft.

The valve device preferably includes a cup member 6 and a cover member 7 which are secured together to provide a housing forming a cylindrical chamber 8. More particularly the cup 6 includes a radial wall 9 and an axial wall 10.

The radial wall 9 is provided with a centrally disposed integral cylindrical tubular extension 11 which projects axially outward from the radial wall and is adapted to be received and secured within one end of a section of the conduit or line 3.

The cover 7 includes a radial wall 12 and an integral axial tubular extension 13, which substantially correspond with the radial wall 9 and extension 11 of the cup member. The extension 13 is adapted to be received and secured within one end of another section of the line 3. As exemplified in the drawings, the radial walls 9 and 12 of the members, are arranged in parallel relation and the tubular extensions are axially aligned and in communication with the valve chamber 8.

The members 6 and 7 comprising the housing, may be secured together in any manner desired, but as illustrated herein, are preferably permanently assembled by providing the peripheral edge of the axial wall 10 of member 6 with an internal rabbet to form a round seat 14 for a peripheral edge portion of the radial wall 12 of member 7, so that an edge portion of wall 10 can be upset or flanged over on the radial wall 12, as indicated at 15, to maintain the members in intimate engagement and provide a fluid tight housing.

The radial wall 9 of cup member 6 adjacent the axial wall 10 is preferably provided with a threaded aperture 16, which receives a set screw 17. The inner end of the set screw may be rounded as indicated and its outer end is preferably provided with a slot for receiving a tool, such as the blade of a screw driver, for manipulating the screw to adjust a valve member 18 arranged in the valve chamber 8. A lock nut 19 may be employed for locking the screw 17 in any position to which it may be adjusted.

The valve member 18 may be constructed as desired but as herein illustrated, is preferably made in the form of a relatively thin flat round flexible disc. The valve member 18 may be constructed of any material suitable for the purpose but is preferably constructed of a material such as beryllium copper, and is gauged to a predetermined range of flexibility or yieldability, so that it will be sensitive to fluid pressure.

As illustrated in Figures 2 and 3 of the drawing, the diameter of the valve member 18 and the internal diameter of the valve chamber 8 are predetermined. More specifically in this respect, the diameter of the valve member 18 is somewhat less than the internal diameter of the chamber so that when the valve member 18 is in the position illustrated in Figures 2 and 3 of the drawing, a crescent shaped gap or space will be provided which has a definite functional relationship with respect to the internal diameter of the chamber 8, including the internal diameters of the tubular extensions 11 and 13. The arrangement is preferably such that a predetermined volume of fluid will circulate through the crescent shaped gap in accordance with a predetermined pressure. If the pressure is relatively normal and constant, the valve member 18 will assume the full line position as illustrated in Figures 2 and 3 of the drawing, but if the pressure is increased, the valve member 18 will be caused to flex or yield as illustrated by the dotted lines in Figure 2, to nearly close the axial passage formed by the tubular extension 11, to automatically reduce the flow of fluid passing therethrough. In other words, the valve member 18 is designed so that it may float or flap within the chamber 8 as well as flex or yield to automatically maintain, within practicable limits, a substantially uniform flow of fluid through the valve device. As pointed out above, fluctuations in the pressure and flow of fluid through the conduit or line 3 will vary in accordance with the engine speed of an automotive vehicle and the valve device 4 is intended to automatically reduce in some measure any excessive pressure in the line 3. The valve device serves to automatically maintain a substantially uniform pressure in the line. If back pressure should occur by backfiring in the engine, the valve member will automatically flap against the radial wall 12 as indicated by the dotted lines.

When a valve device embodying the single adjustment 17 is employed, it is necessary to install the device as illustrated in Figure 1, otherwise the valve will be inoperative. In other words, it is possible to install the valve device illustrated in Figure 2 in a position directly opposite to that illustrated in Figure 1.

In order to facilitate installation, the modified valve device illustrated in Figure 4 of the drawing is provided with a pair of adjustable means 20 and 21 disposed on the opposite sides of the longitudinal axis of the device. With this improved valve device, the valve member therein can be adjusted to a greater number of operative positions, thereby permitting the device to be connected in a line in either of two positions. More particularly in this respect, if the valve device illustrated in Figure 4 is interposed in a line 3, the adjustable means 21 will be retracted and the adjustable means 20 adjusted so that the valve member will assume any position desired, including that illustrated in Figure 2.

If the position of the valve device shown in Figure 4 is reversed, the adjustable means 20 will be retracted and adjustable means 21 adjusted to locate the valve member in the position desired. Obviously, the adjustable means 20 and 21 can both be adjusted to locate the valve member in accordance with the requirements of any particular installation.

I have described what I believe to be the best embodiments of my invention. I do not wish, however, to be confined to the embodiments shown, but what I desire to cover by Letters Patent is set forth in the appended claims.

I claim:

1. A regulating and governing valve structure for fluid pressure differential power applications comprising entrance and exit passages and a valve chamber connected to said passages, a round flexible valve plate enclosed and loosely arranged for bodily movement and flexation in said valve chamber responsive to fluid pressure differential variations and positioned between and partially obstructing the fluid flow between said passages, and manually actuated means to limit the free movement of said valve plate within said valve chamber.

2. A regulating and governing valve structure for fluid pressure differential power applications comprising entrance and exit passages and a valve chamber connected to said passages, a flexible valve plate enclosed and loosely arranged for movement in said valve chamber and being responsive to fluid pressure differential variations and positioned between and partially obstructing the fluid flow between said passages, and a pair of manually operable means to limit the free movement of said valve plate within said valve chamber.

3. A fluid control valve having a cylindrical chamber and tubular extensions communicatively connected with the chamber, and a round thin valve member of light weight loosely arranged in the chamber, the diameter of the valve member being slightly less than that of the chamber to provide a generally crescent shaped passage through which fluid may circulate in accordance with variations in fluid pressure, and means carried by the valve and adjustable to engage the valve member in a manner to normally maintain the valve member at an angle with reference to the axes to the tubular extensions and whereby the size of the crescent shaped passage may be varied.

4. A fluid control valve having a cylindrical chamber and being provided with aligned tubular extensions communicatively connected with the chamber, abutment means disposed in the chamber, and a round thin valve member loosely arranged in the chamber for normally engaging the abutment to locate the valve member in an angular position with respect to the axes of the tubular extensions so that fluid may circulate from one tubular extension to the other tubular extension through the valve chamber when the flow of fluid is in one direction, and said valve member being so constructed and arranged that when the flow of fluid is reversed, the member will be caused to automatically flip to prevent circulation of fluid through the valve.

References Cited in the file of this patent

UNITED STATES PATENTS

| Number | Name | Date |
|---|---|---|
| 501,437 | Pierce | July 11, 1893 |
| 1,619,238 | Buss | Mar. 1, 1927 |
| 1,905,065 | Scholl | Apr. 25, 1933 |
| 1,920,068 | Elian | July 25, 1933 |
| 2,025,626 | Wheeler | Dec. 24, 1935 |
| 2,567,391 | Mead | Sept. 11, 1951 |

FOREIGN PATENTS

| Number | Country | Date |
|---|---|---|
| 13,672 | Great Britain | 1891 |
| 14,369 | Denmark | Mar. 8, 1911 |
| 706,982 | France | Dec. 3, 1930 |
| 801,926 | France | Feb. 15, 1936 |